United States Patent [19]
Akers

[11] Patent Number: 6,118,766
[45] Date of Patent: Sep. 12, 2000

[54] MULTIPLE ISDN CARRIER SYSTEM

[75] Inventor: Francis I. Akers, San Mateo, Calif.

[73] Assignee: GoDigital Networks Corporation, Fremont, Calif.

[21] Appl. No.: 08/701,813

[22] Filed: Aug. 21, 1996

[51] Int. Cl.[7] .............................. H04J 3/00; H04M 11/06
[52] U.S. Cl. ..................... 370/249; 370/420; 370/465; 370/524; 370/535; 348/12; 379/93.06; 455/5.1
[58] Field of Search ................................... 370/249, 250, 370/251, 389, 395, 420, 465, 522, 524, 535, 536, 537, 904; 348/6, 7, 10, 12, 13, 14; 379/90.1, 93.01, 93.05, 93.06, 93.07, 93.08, 93.15; 455/3.1, 3.3, 4.2, 5.1, 6.1, 6.2, 6.3; 375/240, 241, 257, 258, 286, 288, 289

[56] References Cited

U.S. PATENT DOCUMENTS

| | | | |
|---|---|---|---|
| 3,660,609 | 5/1972 | Tremblay et al. | 179/16 F |
| 3,746,795 | 7/1973 | Fitzsimons et al. | 179/16 F |
| 4,730,311 | 3/1988 | Carse et al. | 370/110.1 |
| 4,853,949 | 8/1989 | Schorr et al. | 379/2 |
| 5,140,630 | 8/1992 | Fry et al. | 379/179 |
| 5,247,347 | 9/1993 | Litteral et al. | 358/85 |
| 5,400,322 | 3/1995 | Hunt et al. | 370/19 |
| 5,410,343 | 4/1995 | Coddington et al. | 348/7 |
| 5,420,886 | 5/1995 | Ohmori | 370/249 |
| 5,436,895 | 7/1995 | Matsumoto | 370/60.1 |
| 5,440,335 | 8/1995 | Beveridge | 348/13 |
| 5,448,635 | 9/1995 | Biehl et al. | 379/93.06 |
| 5,450,486 | 9/1995 | Maas et al. | 370/524 |
| 5,459,729 | 10/1995 | Bliven | 370/524 |
| 5,528,281 | 6/1996 | Grady et al. | 348/7 |
| 5,577,115 | 11/1996 | Deutsch et al. | 370/359 |
| 5,596,604 | 1/1997 | Cioffi et al. | 345/260 |
| 5,598,413 | 1/1997 | Sansom et al. | 370/536 |
| 5,610,922 | 3/1997 | Balatoni | 370/468 |
| 5,621,731 | 4/1997 | Dale et al. | 370/79 |
| 5,627,833 | 5/1997 | Bliven | 370/464 |
| 5,657,381 | 8/1997 | Hughes-Hartogs | 379/100.12 |
| 5,668,814 | 9/1997 | Balatoni | 379/93.06 |
| 5,682,385 | 10/1997 | Garcia et al. | 370/458 |
| 5,691,718 | 11/1997 | Balatoni et al. | 370/535 |
| 5,787,088 | 7/1998 | Dagdeviren et al. | 370/493 |
| 5,815,505 | 9/1998 | Mills | 370/252 |

FOREIGN PATENT DOCUMENTS

| | | | |
|---|---|---|---|
| 0 251 986 A2 | 1/1988 | European Pat. Off. | H04Q 5/02 |
| 0 251 986 A3 | 1/1988 | European Pat. Off. | H04Q 5/02 |
| WO 96/29814 | 9/1996 | WIPO | H04M 11/00 |

OTHER PUBLICATIONS

"ISDN Basic Access Digital Subscriber Lines," Bell Communications Research, Technical Advisory, TA–TSY–000363, Issue 1, Mar. 1987.

"Universal Digital Channel (UDC) Requirements and Objectives," Bell Communications Research, Technical Advisory, TA–TSY–000398, Issue 1, Sep. 1986.

"Making the Transition: Fiber winds its way home," Telephony Integrating Voice and Data Communications, Feb. 1988.

"2B1Q, Line Code Tutorial," MSAN–127, Mitel Semiconductor Product News, Jan. 1987.

"Implementing an ISDN Architecture Using the ST–Bus," MSAN–128, Mitel Semiconductor Product News, Mar. 1987.

(List continued on next page.)

Primary Examiner—Alpus H. Hsu
Attorney, Agent, or Firm—Limbach & Limbach L.L.P.; Seong-Kun Oh

[57] ABSTRACT

High-speed digital transmission can be achieved with existing phone lines and HDSL chipsets. Two original ISDN signals [4,5] at a rate of 160 kbps are multiplexed by a MICS card [6] of a signal provider [1]. The resulting digital signal is transported over a twisted cable pair [2] which has an approximate maximum length of 16 kft. At a receiving end, the signal is demultiplexed and regenerated by a subscriber's MICS card [7]. The subscriber's MICS card is line-powered via the cable [2] to avoid dependence upon local power. The regenerated signals are transmitted over two ISDN cables to remote premises which can be as far as 18 kft away.

45 Claims, 5 Drawing Sheets

OTHER PUBLICATIONS

Time Space Switching of 8, 16 or 32K Bps Channels Using the MT8980, MSAN–129, Mitel Semiconductor Product News, Apr. 1987.

"Implementation Details of the MT8930 S/T Interface" MSAN–130, Mitel Semiconductor Product News, Oct. 1988.

"Digital Networks, Digital Sections and Digital Line Systems," The International Telegraph and Telephone Consultative Committee, ISBN 92–61–03351–2, Nov. 1988.

"A Two–Wire Digital 0+2 Local–Line System for the Voice Network," British Telecommunications Headquarters, Specification RC 7328, Apr. 1988.

Requirements and Objectives for Digital Main Line (DAML), Pacific Bell, PUB L–780057–PB/NB, Issue 1, May 1989.

"ISDN U–Interface Transceiver," Advance Information, MC145572, Motorola, Inc. 1995.

"HCMOS Microcontroller Unit," MC68HC05J1, Motorola, Inc. 1989.

"Digital Data System Data Service Unit Interface Specification," Bell System Data Communications, Technical Reference, Nov. 1981.

Article on "Bt8960 Single–Chip 2B1Q Transceiver", Mar. 1996.

ISDN–Network Interface Unit (I–NIU) Request for Quotation RFQ #N 96–NET–0049 Technical and Environmental Requirements.

U.S. application No. 08/747,068, filed Nov. 8, 1996.

U.S. application No. 08/717,475, filed Sep. 20, 1996.

"ISDN Basic Access Digitial Subscriber Lines", Technical Reference TR–TSY–000393, Bellcore Communications Research (May 1988).

"ISDN Basic Access Transport System Requirements", Technical Advisory TA–TSY–000397, Bell Communications Research (Oct. 1986).

MULTIPLE ISDN CARRIER SYSTEM

FIELD OF THE INVENTION

The field of the invention relates generally to high speed digital communication. More particularly, the field of the invention relates to transportation of two ISDN signals over one twisted cable pair from a front end and regeneration of the ISDN signals at a remote end.

BACKGROUND OF THE INVENTION

The recent growth of the Internet has created both a tremendous demand for additional subscriber access to public switched telephone networks (PSTN) and a demand for additional bandwidth for the access. The former demand is being met by deploying additional analog access lines so that modems can be used for the Internet access, and the latter demand is being met by deploying integrated service digital network (ISDN) lines. In the first case, although the Internet access is provided, it is not of sufficient bandwidth to provide the graphic-rich service which typically is desired. In both cases, the installation of an additional copper-pair based access line is expensive and time consuming due to a general shortage of pre-existing installed cable pairs. Also in the latter case, the ISDN installation on existing cable pairs is limited to about 70% of the installed base due to the way in which ISDN transport was designed specifically for non-loaded cable plants. The existing copper cable outside plant was constructed in accordance with design rules specifying that for local loops exceeding 13 kilo-ohms (kΩ), or approximately 18 kilo-feet (kft) which is equivalent to 5,486 meters, loading coils or filter capacitors are added to remove voice frequencies shifted above 4 kilo-Hz (kHz) due to the loop resistance. The REA loop survey of 1986 indicates that for the US as a whole, approximately 85% of all loops are non-loaded. Since ISDN uses a digital signal operating at a center frequency of 40 kHz, it will not transmit in the presence of a load coil. Bridged taps or branches attached to a primary cable run further reduce the reach of an ISDN signal, with the net result being that only about 70% of all existing subscribers can have ISDN service added without additional construction expenses, as reported by Pacific Bell in early 1996. In summary, providing ubiquitous digital access for all telephone subscribers is limited by both the number of pre-existing cable pairs and limitations imposed by the design of the telephone outside plant.

One solution is for the telephone company to simply install more copper cables. In fact, record amounts of copper cables are being installed in response to the huge demand for added lines. But this is not a financially viable alternative for the telephone companies due to the long depreciation schedule for these cables. It is generally recognized that a higher-bandwidth media, such as fiber optic cable, is the ultimate solution for the digital access, but while the technical and financial issues related to fiber installation are being worked out, installing copper cables only consumes capital and delays the day for fiberization.

Another solution to this problem is to utilize TV cable networks and cable modems instead of telephone networks. The cable modems allow cable TV providers to offer data services and Internet connectivity. Because coaxial cable plants were designed for unidirectional analog broadcast services, they could not carry bi-directional data flows. The cable systems used a cable looping around the service area with taps at every home or small office. For the efficient bi-directional data transport, the cable networks must be upgraded to take on the characteristics of the star topology, but the reconfiguration process is prohibitively expensive.

One other approach is to more efficiently utilize existing phone lines for high-speed digital transmissions. The phone lines are made of twisted copper pairs and are configured in a star-like architecture that is suitable for bi-directional communications. The principal technology for placing a digital signal onto a copper pair that originally provides only analog dial tone is called integrated service digital network (ISDN). ISDN was developed in the 1980's, when state-of-the-art digital encoding technology resulted in the standards as described in Bellcore documents TR-TSY-00393 (ISDN Basic Access Digital Subscriber Lines, May 1988) and TA-TSY-00397 (ISDN Basic Access Transport System Requirements, October 1986), disclosures of which are incorporated herein by reference. The basic transmission speed for ISDN is 160 kilobits per second (kbps). This digital rate and its corresponding communication method are digital subscriber line (DSL). It is significant that ISDN was designed specifically for a non-loaded telephone plant since loading capacitors effectively attenuated high frequency digital signals. The non-loaded cable plant reaches 18 kilo-feet (kft) but only 85% of all subscribers on average. This results in a problem with respect to reaching all subscribers wishing ISDN services. Since 1990, the development of microprocessors has significantly improved the performance of communication chipsets. High bit rate subscriber line (HDSL) chipsets can run at 784 kbps or even 1 Mbps to transport one half of a T1/E1 digital loop carrier signal in an application called "Repeaterless T1/E1." Other types of high speed communication technologies for the twisted pairs, such as asymmetric DSL (ADSL), are emerging from labs but are still too expensive for wide range applications. HDSL technology can be used to transport either one high speed signal or several lower speed signals through multiplexing and demultiplexing. Installing one high bit line for multiple lower bit signals is more cost effective than installing several lower bit lines. This approach was explored by several inventors in the past.

By way of example, Carse et al., U.S. Pat. No. 4,730,311 describe a multiplexer for use in a telephone system in which a plurality of subscriber locations are connected to a central office by a single subscriber loop. Carse et al. focus on the design of the multiplexer rather than the entire communication system. Their technique applies generally to any methods of digital transmission, and consequently the transmission rate is arbitrary. The subscribers are defined to be locally powered and backed-up with battery power. The battery back-up can only last for a limited period of time in the case of local power loss. For the design of the multiplexer, Carse et al. does not define either a digital interface or standard of loopback testing. Also, the configuration of the central office is not described.

Litteral et al., U.S. Pat. No. 5,247,347 and Coddington et al., U.S. Pat. No. 5,410,343 define how to provide digital video signals from a video information provider to one or more of a plurality of subscriber premises. However, the multiplexers used in both systems mainly perform frequency domain multiplexing/demultiplexing which is inherently disadvantageous with respect to time domain multiplexing/demultiplexing. Furthermore, the power source of the multiplexers is not specified. In addition, Litteral et al. and Coddington et al. only describe transport and encoding of specific video signals rather than generic digital signals.

Bliven, U.S. Pat. No. 5,459,729 describes a method and apparatus for transmitting and receiving multiple telephone signals over a single twisted pair. Two conventional telephone signals are converted into one digital signal and then transported over a single twisted pair at a rate of 160 kbps. Creating a multiplicity of telephone channels in this way is sufficient for analog POTS but is too low to provide adequate Internet access.

Accordingly, it is a primary object of the present invention to provide a communication system that transports multiple ISDN signals over a single twisted cable pair at a high bit rate. It is a further object of the invention to provide line powering to a remote terminal to avoid dependence upon local power. This invention is subsequently referred to as a "multiple ISDN carrier system" or abbreviated as "MICS."

SUMMARY OF THE INVENTION

These and other objects and advantages are attained by connecting a signal provider to a signal subscriber through a twisted cable pair. The maximum length of the cable is approximately 16 kft depending upon the wire gauge, which offers roughly 1.2 k$\Omega$ loop resistance, from the signal provider to the signal subscriber, back to the signal provider. The signal provider comprises two ISDN cards and one MICS card. The ISDN cards provide a digital interface between a main telephone network and a local ISDN network at a transmission rate of 160 kbps. The MICS card connecting the ISDN cards to the twisted cable pair is powered by a 48-Volt power supply. The components of the MICS card comprise a transceiver, a digital interface module, and a utility microprocessor. The transceiver uses a 2B1Q transport mechanism and operates at a minimum rate of 320 kbps. The MICS card uses two ISDN U-interfaces. The utility microprocessor performs loopback testing in accordance with the National ISDN Standards.

The signal subscriber comprises a MICS card and two ISDN cables. The MICS card connects the twisted cable pair to the two ISDN cables and is powered via the twisted cable pair. The components of the MICS card contain a transceiver, a digital interface module, and a utility microprocessor which are characterized by the same structure as those of the MICS card of the signal provider. The two ISDN cables carry the signals to a single remote premise or multiple remote premises where networking devices (NT1's) are located. The transmission rate of the cables is 160 kbps, and their maximum length is 18 kft.

DETAILED DESCRIPTION

Figure 1:
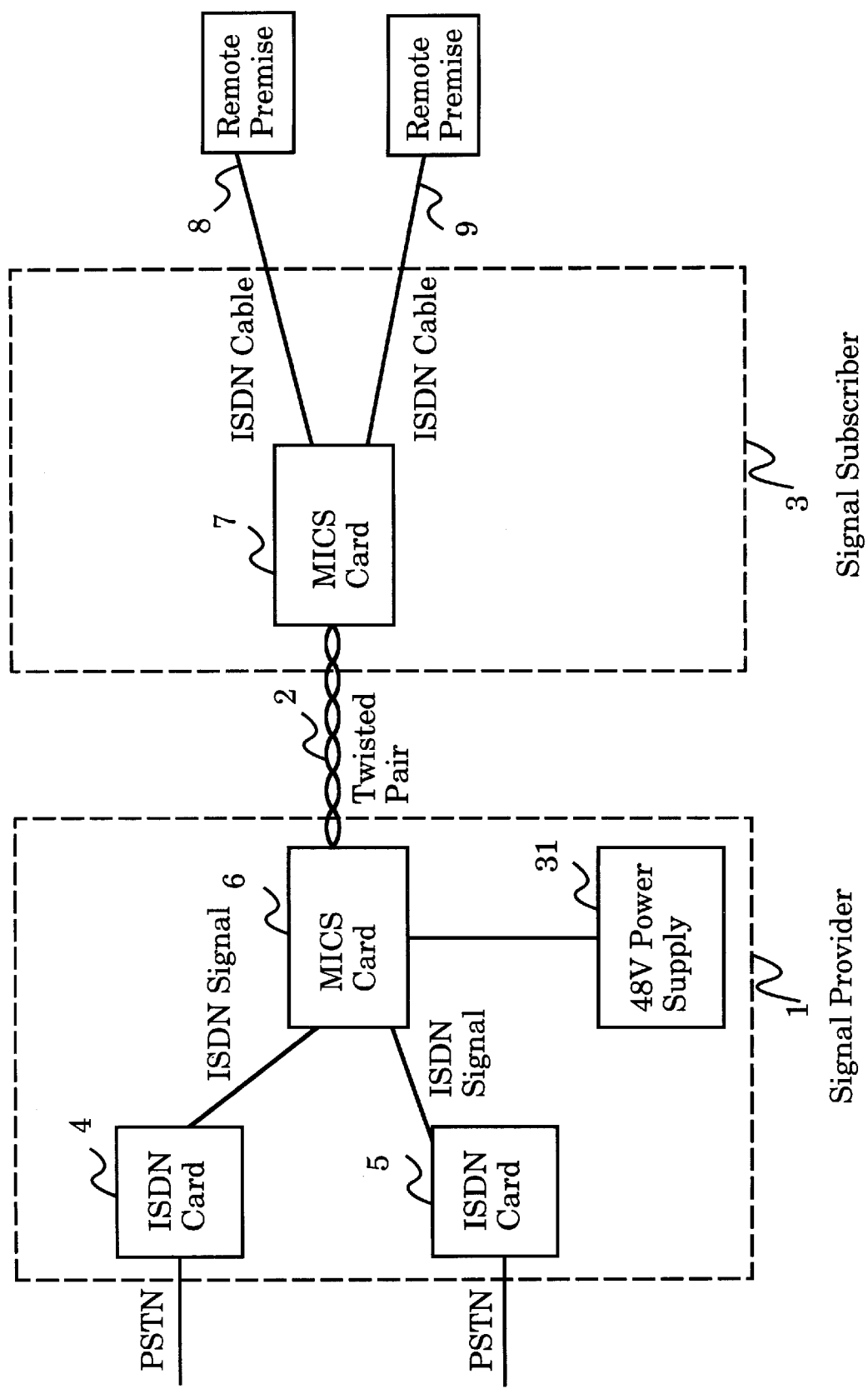
FIG. 1 is a schematic diagram of a high bit communication system with a single twisted cable pair.

A schematic diagram of an aspect of the invention is shown in FIG. 1. A signal provider 1 comprises two ISDN cards 4 and 5 and a MICS card 6. The MICS card 6 is plugged into an equipment shelf, constituting a signal provider terminal. The ISDN cards 4 and 5 convert an E1 or T1 signal on a main telephone network into a 160-kbps ISDN signal on a local ISDN network. The ISDN signals are then multiplexed by the MICS card 6, and the multiplexed signal is sent to a signal subscriber 3 over a twisted cable pair 2. The MICS card 6 is powered by a 48-Volt power supply 31. Since each of the ISDN signals has a rate of 160 kbps, the twisted cable pair 2 is required to provide a minimum speed of 320 kbps. The maximum length of the cable is limited by either the MICS system's ability to transmit the powering voltage, or the signal processing ability of the digital encoding chip. For example, the BROOKTREE 8960 chip has an advertised reach of 16.5 kft. Both of these limitations are due to a combination of loop resistance, loop capacitance, and other signal attenuation and degrading influences. The reach of a digital system may be increased by removing bridged taps, or by renewing cable splices, or by replacing cables having water intrusion, so the system reach is not only variable but also controllable to some extent, depending on the value of providing the digital service to the customer. In summary, one practical limit of the reach of the system is the loop resistance which governs powering as well as signal. Given the state of the art in digital encoding, as exemplified by the BROOKTREE 8960 chip, 12 k$\Omega$ is roughly a practical limit, and this corresponds to approximately 16.5 kft on mixed 26 and 24 gauge cable plant. It is anticipated that the practical reach of the MICS system may increase as improvements are made in subsequently available digital encoding chips which replace the BROOKTREE 8960.

The signal subscriber 3 contains a MICS card 7 and two ISDN cables 8 and 9. The MICS card 7 is powered via the twisted cable pair 2. The amount of power which needs to be transmitted does not exceed ±67.5 Volts on either wire in accordance with the U.S. safety standards. Internationally, the safety requirement for line-powering voltage varies and can go as low as ±25 Volts on each wire. The digital signal transported over the twisted cable pair is demultiplexed and regenerated into two individual ISDN signals. The regenerated ISDN signals have the same signal quality and distance capability as the original ones, and they are sent to remote premises over the two ISDN cables 8 and 9.

Figure 2:
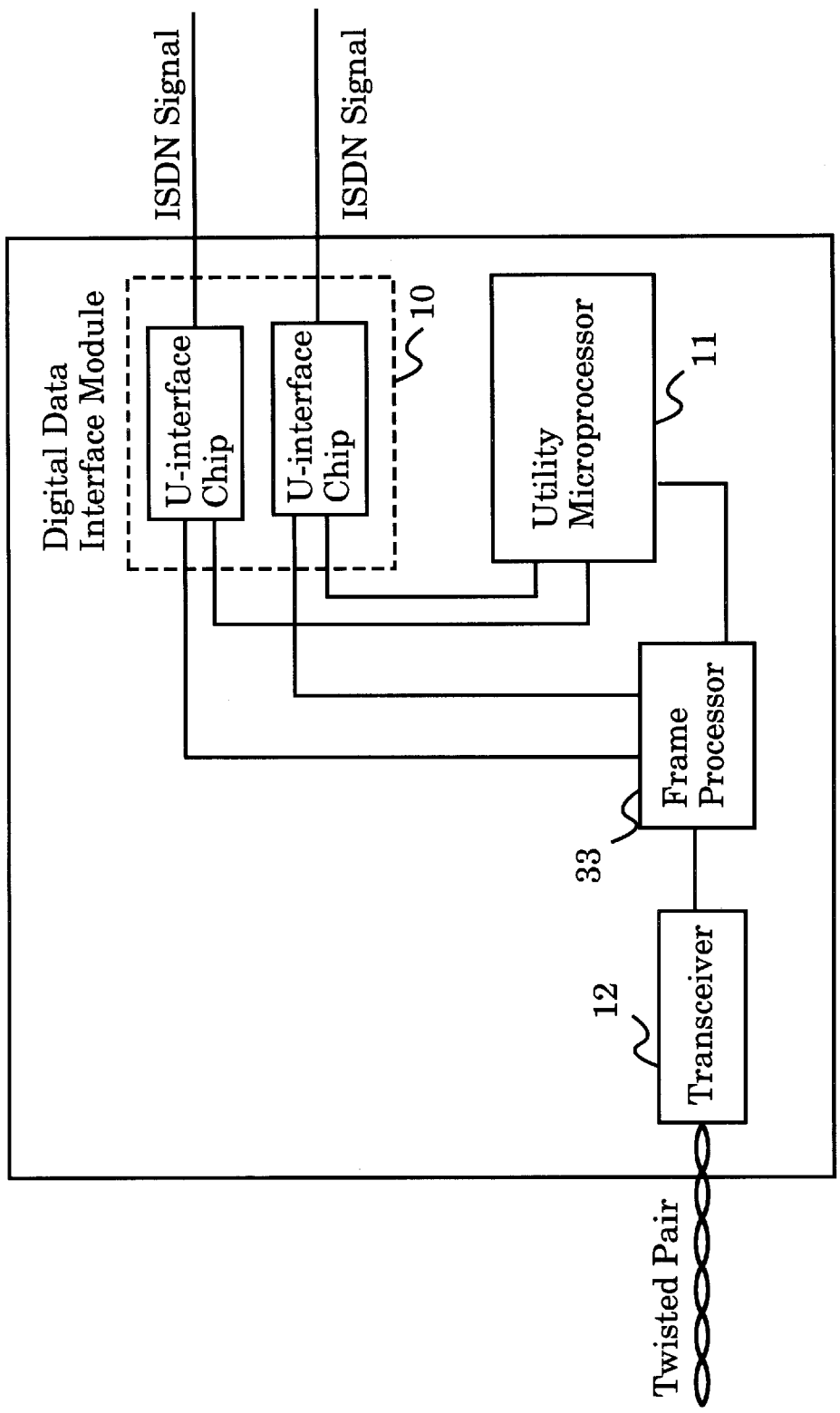
FIG. 2 is a simplified block diagram for the MICS cards illustrated in FIG. 1.

Each of the MICS cards 6 and 7 comprises a digital data interface module 10, a utility microprocessor 11, a transceiver 12, and a frame processor 33, as shown in FIG. 2. The digital data interface module 10 uses two ISDN U-interfaces, such as Motorola MC145572. The utility microprocessor 11 such as Motorola M68HC05 family provides loopback testing in accordance with the National ISDN Standards. The transceiver 12 uses a 2B1Q transport mechanism and operates at a speed of at least 320 kbps. One of such transceivers is Bt8960 DSL Transceiver by BROOKTREE Corporation with a transmission rate of 416 kbps in full duplex mode.

For example, in accordance with one aspect of the present invention, there are provided two U-interface chips in the digital data interface module 10 such as ISDN U-Interface Transceiver MC145572 respectively for receiving ISDN signals for multiplexing before transmission along the twisted pair 2. See ISDN U-Interface Transceiver MC145572, pp.2-1, 2-2; FIGS. 2-1 and 2-2. The utility microprocessor such as the Motorola MC68HC05J1 HCMOS Microcontroller Unit coupled to the U-interface chips operates to provide control and synchronization for the MICS card such as providing clock signals for synchronization in addition to providing loopback testing as discussed above. See Motorola MC68HC05J1 HCMOS Microcontroller Unit, pp. 1-1, 1-2. Additionally, as shown in FIG. 2, the transceiver 12 such as the Brooktree BT8960 Single-Chip 2B1Q Transceiver operates to convert the multiplexed PCM (Pulse Code Modulation) data from the frame processor 33 into 2B1Q code for transmission along the twisted pair 2. In addition to multiplexing the PCM data, the frame processor 33 creates a transport frame and handles any other signaling information necessary. Moreover, at the signal subscriber 3 as shown in FIG. 1, the same process in reverse (for example, demultiplexing instead of multiplexing) is implemented to recover the PCM data to be provided to the remote premises 8, 9. Within the scope of the present invention, existing techniques for multiplexing such as time or frequency domain multiplexing, for example, can be used. Further detail of the BT8960 transceiver can be found in BT8960 Single-Chip 2B1Q Transceiver, pp.1–5, FIGS. 1 & 2, the disclosure of which is incorporated by reference in its entirety. Moreover, the disclosures of Motorola MC68HC05J1 HCMOS Microcontroller Unit and ISDN U-Interface Transceiver MC145572 are each additionally incorporated herein by reference.

Figure 3:
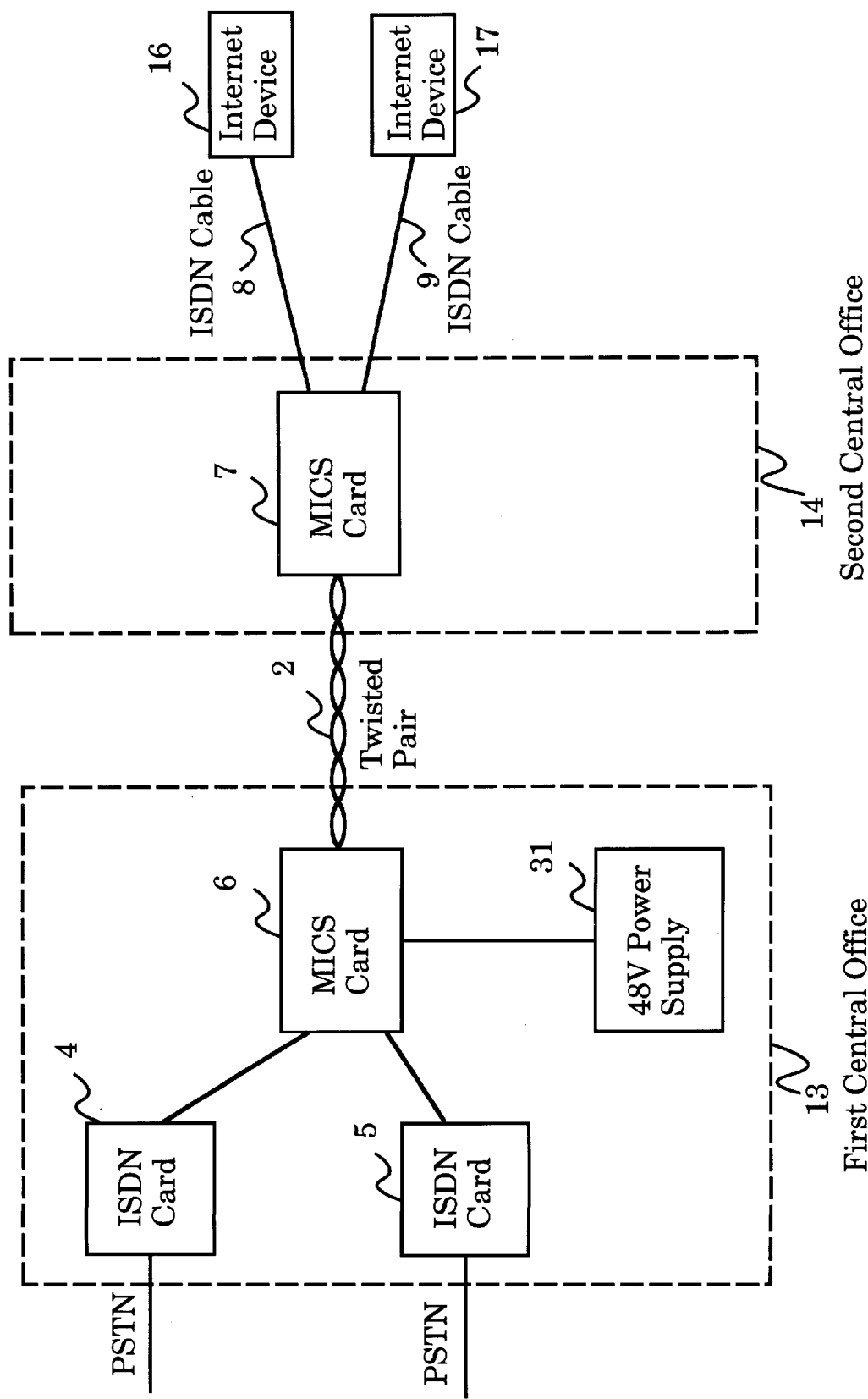
FIG. 3 is a schematic diagram according to an embodiment called office-to-office.

A first embodiment of the invention is an office-to-office system, as shown in FIG. 3. A second central office 14 is not equipped with an ISDN switch, but it receives two ISDN lines from an equipped first central office 13 through the twisted cable pair 2. The cable can be roughly as long as 16 kft at maximum which approximately corresponds to a maximum loop resistance of 12 kΩ. Inside the subscriber's office, two Internet devices 16 and 17 are connected to the network through the two ISDN cables. The types of the devices can be, e.g., a personal computer, a workstation, a facsimile machine, a telephone set, and other similar devices.

Figure 4:
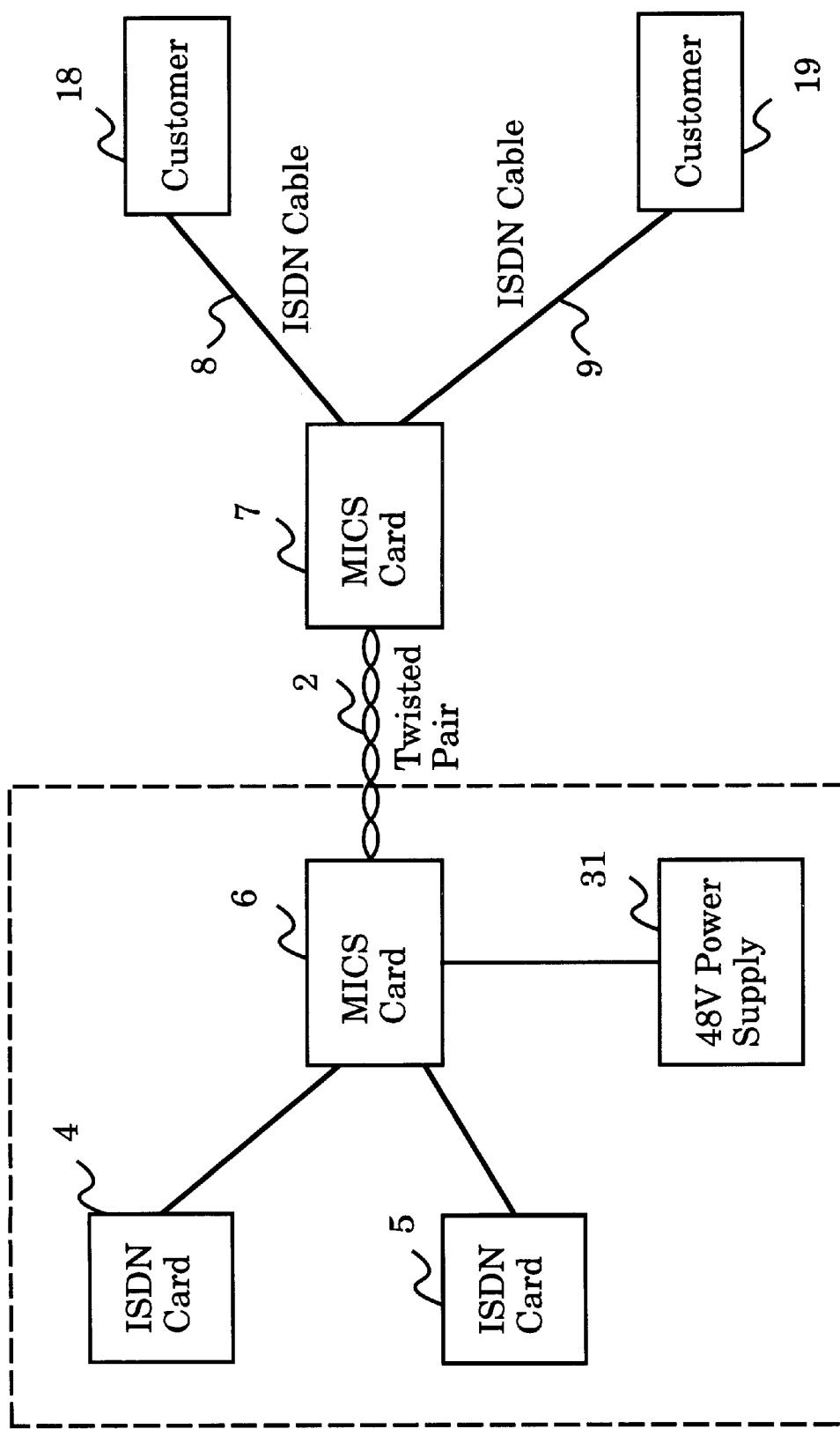
FIG. 4 is a schematic diagram according to an embodiment called office-to-house.

A second embodiment of the invention is an office-to-house system, as illustrated in FIG. 4. A MICS card 7 is installed on a pole, on a house, or in a cabinet. Two customers 18 and 19 in a same house or two different houses each have one ISDN access, and they are kept in close proximity for maintenance purposes. Because the MICS card 7 regenerates high quality ISDN signals, the two customers can be 18 kft away from the MICS card.

Figure 5:
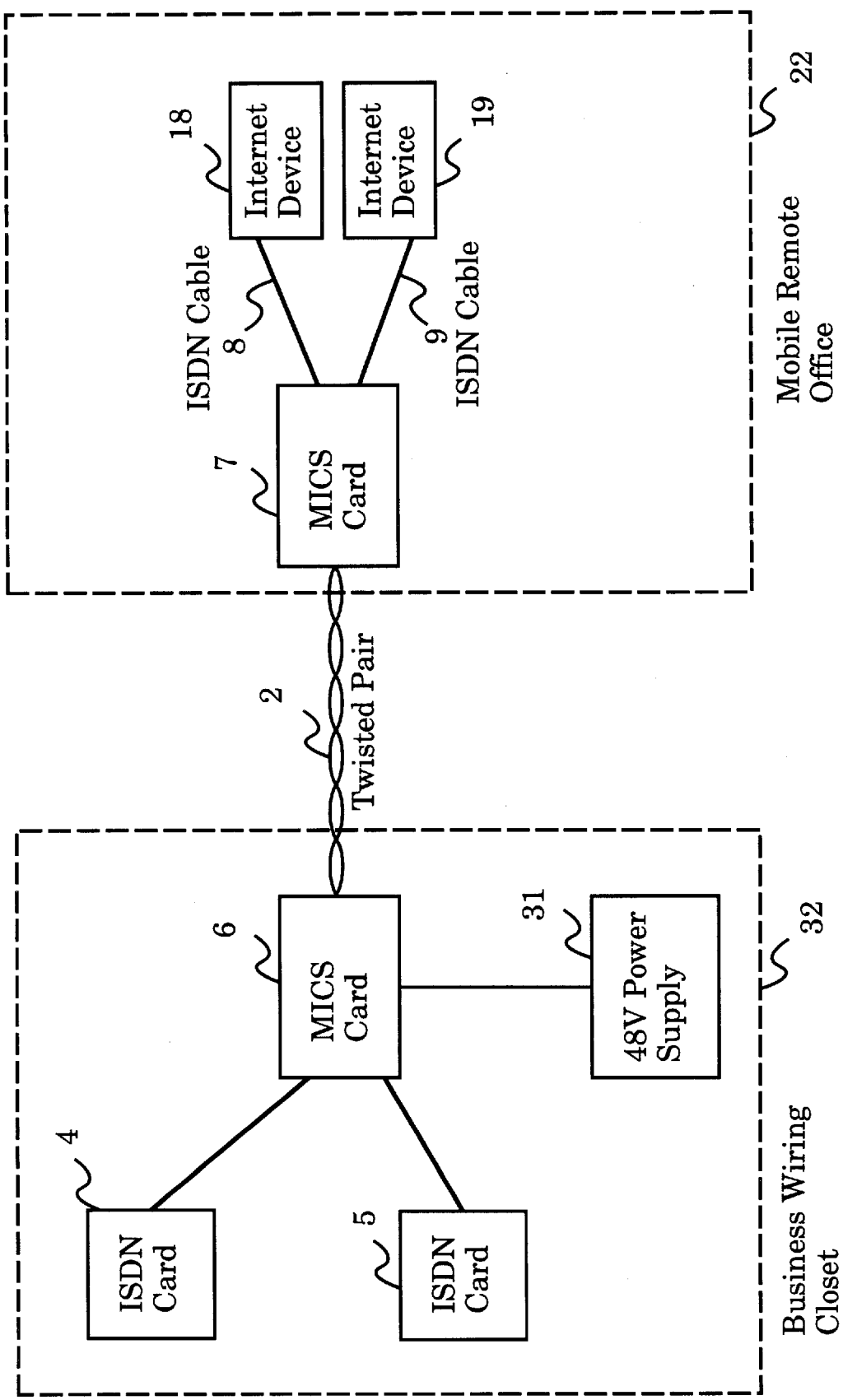
FIG. 5 is a schematic diagram according to an embodiment called corporate-intranet.

A third embodiment of the invention is a corporate-intranet system, as shown in FIG. 5. In this case, a corporate ISDN user needs ISDN accesses at a remote office 22 whose location is not permanently fixed. The twisted cable pair 2 is temporarily extended from a business wiring closet 32 to the remote office to provide two ISDN connections.

It will be clear to one skilled in the art that the above embodiments may be altered in many ways without departing from the scope of the invention. For example, more than one twisted cable pair can be used to transport more than two ISDN signals. Accordingly, the scope of the invention should be determined by the following claims and their legal equivalents.

What is claimed is:

1. A high bit communication system, comprising:
    a single twisted cable pair;
    a signal provider including a plurality of ISDN cards and a first MICS card configured to multiplex at least two ISDN signals, each of said ISDN signals having a transmission rate of 160 kbps, said signal provider configured to provide said multiplexed signal to a first end of the single twisted cable pair at a transmission rate of at least 320 kbps; and
    a signal subscriber including a second MICS card, said signal subscriber coupled to a second end of said single twisted cable pair, configured to receive said multiplexed signal from said signal provider along said single twisted cable pair, said signal subscriber further configured to demultiplex said multiplexed signal and accordingly to generate separate ISDN signals;
    wherein said first MICS card includes:
        a first frame processor;
        a first transceiver coupled to said first frame processor and said first end of said single twisted cable pair, said first transceiver configured to transmit said multiplexed signal at said transmission rate of at least 320 kbps using 2B1Q transport mechanism;
        a first digital interface module coupled to said plurality of ISDN cards configured to receive a plurality of ISDN signals at said transmission rate of 160 kbps, said first digital interface module further coupled to said frame processor; and
        a first utility microprocessor coupled to said first digital interface module and said first frame processor configured to control said first frame processor, said first transceiver and said first digital interface module, said first utility microprocessor further configured to provide loopback testing; and further
    wherein said second MISC card includes:
        a second frame processor;
        second transceiver coupled to said second frame processor and said second end of said single twisted cable pair, said second transceiver configured to receive said multiplex signal via said single twisted cable pair at said transmission rate of at least 320 kbps;
        a second digital interface module coupled to said second frame processor configured to provide said plurality of ISDN signals at said transmission rate of 160 kbps; and
        a second utility microprocessor for controlling said second digital interface module and said second frame processor, said second utility microprocessor further configured to provide loopback testing.

2. The system of claim 1 wherein the single twisted cable pair provides 1.2 kΩ maximum loop resistance from the signal provider to the signal subscriber and back to the signal provider.

3. The system of claim 2 wherein said signal subscriber is configured to provide said ISDN signals to a plurality of remote premises at said transmission rate of 160 kbps via a plurality of ISDN cables.

4. The system of claim 3 wherein said signal provider further includes a power supply configured to supply power to said first MICS card and said second MICS card, said power supply configured to provide power to said second MICS card via said single twisted cable pair.

5. The system of claim 4 wherein said transmission rate over said single twisted cable pair is 416 kbps.

6. The system of claim 5 wherein said plurality of ISDN cards provide digital interfaces between a main telephone network and a local ISDN network with a transmission rate of 160 kbps.

7. The system of claim 6 wherein the first MICS card connects the plurality of ISDN cards to the first end of the twisted cable pair and is powered with a 48-Volt power supply.

8. The system of claim 7 wherein the first digital interface module uses 6B+D or ISDN U-interfaces.

9. The system of claim 8 wherein the first MICS card is powered via the twisted cable pair, and the line voltage does not exceed ±160 Volts in total or ±80 Volts per wire in accordance with the US safety standards.

10. The system of claim 8 wherein the first MICS card is powered via the twisted cable pair in accordance with the international safety standards, which vary and can go as low as ±50 Volts on each wire.

11. The system of claim 1 wherein said signal subscriber is configured to provide said ISDN signals to a plurality of remote premises at said transmission rate of 160 kbps via a plurality of ISDN cables.

12. The system of claim 11 wherein said signal provider further includes a power supply configured to supply power to said first MICS card and said second MICS card, said power supply configured to provide power to said second MICS card via said single twisted cable pair.

13. The system of claim 12 wherein said transmission rate over said single twisted cable pair is 416 kbps.

14. The system of claim 13 wherein said plurality of ISDN cards provide digital interfaces between a main telephone network and a local ISDN network with a transmission rate of 160 kbps.

15. The system of claim 14 wherein the first MICS card connects the plurality of ISDN cards to the first end of the twisted cable pair and is powered with a 48-Volt power supply.

16. The system of claim 15 wherein the first digital interface module uses 6B+D or ISDN U-interfaces.

17. The system of claim 16 wherein the first MICS card is powered via the twisted cable pair, and the line voltage does not exceed ±160 Volts in total or ±80 Volts per wire in accordance with the US safety standards.

18. The system of claim 16 wherein the first MICS card is powered via the twisted cable pair in accordance with the international safety standards, which vary and can go as low as ±50 Volts on each wire.

19. The system of claim 1 wherein said signal provider further includes a power supply configured to supply power to said first MICS card and said second MICS card, said power supply configured to provide power to said second MICS card via said single twisted cable pair.

20. The system of claim 19 wherein said transmission rate over said single twisted cable pair is 416 kbps.

21. The system of claim 20 wherein said plurality of ISDN cards provide digital interfaces between a main telephone network and a local ISDN network with a transmission rate of 160 kbps.

22. The system of claim 21 wherein the first MICS card connects the plurality of ISDN cards to the first end of the twisted cable pair and is powered with a 48-Volt power supply.

23. The system of claim 22 wherein the first digital interface module uses 6B+D or ISDN U-interfaces.

24. The system of claim 23 wherein the first MICS card is powered via the twisted cable pair, and the line voltage does not exceed ±160 Volts in total or ±80 Volts per wire in accordance with the US safety standards.

25. The system of claim 23 wherein the first MICS card is powered via the twisted cable pair in accordance with the international safety standards, which vary and can go as low as ±50 Volts on each wire.

26. The system of claim 1 wherein said transmission rate over said single twisted cable pair is 416 kbps.

27. The system of claim 26 wherein said plurality of ISDN cards provide digital interfaces between a main telephone network and a local ISDN network with a transmission rate of 160 kbps.

28. The system of claim 27 wherein the first MICS card connects the plurality of ISDN cards to the first end of the twisted cable pair and is powered with a 48-Volt power supply.

29. The system of claim 28 wherein the first digital interface module uses 6B+D or ISDN U-interfaces.

30. The system of claim 29 wherein the first MICS card is powered via the twisted cable pair, and the line voltage does not exceed ±160 Volts in total or ±80 Volts per wire in accordance with the US safety standards.

31. The system of claim 29 wherein the first MICS card is powered via the twisted cable pair in accordance with the international safety standards, which vary and can go as low as ±50 Volts on each wire.

32. The system of claim 1 wherein said plurality of ISDN cards provide digital interfaces between a main telephone network and a local ISDN network with a transmission rate of 160 kbps.

33. The system of claim 32 wherein the first MICS card connects the plurality of ISDN cards to the first end of the twisted cable pair and is powered with a 48-Volt power supply.

34. The system of claim 33 wherein the first digital interface module uses 6B+D or ISDN U-interfaces.

35. The system of claim 34 wherein the first MICS card is powered via the twisted cable pair, and the line voltage does not exceed ±160 Volts in total or ±80 Volts per wire in accordance with the US safety standards.

36. The system of claim 34 wherein the first MICS card is powered via the twisted cable pair in accordance with the international safety standards, which vary and can go as low as ±50 Volts on each wire.

37. The system of claim 1 wherein the first MICS card connects the plurality of ISDN cards to the first end of the twisted cable pair and is powered with a 48-Volt power supply.

38. The system of claim 37 wherein the first digital interface module uses 6B+D or ISDN U-interfaces.

39. The system of claim 38 wherein the first MICS card is powered via the twisted cable pair, and the line voltage does not exceed ±160 Volts in total or ±80 Volts per wire in accordance with the US safety standards.

40. The system of claim 38 wherein the first MICS card is powered via the twisted cable pair in accordance with the international safety standards, which vary and can go as low as ±50 Volts on each wire.

41. The system of claim 1 wherein the first digital interface module uses 6B+D or ISDN U-interfaces.

42. The system of claim 41 wherein the first MICS card is powered via the twisted cable pair, and the line voltage does not exceed ±160 Volts in total or ±80 Volts per wire in accordance with the US safety standards.

43. The system of claim 41 wherein the first MICS card is powered via the twisted cable pair in accordance with the international safety standards, which vary and can go as low as ±50 Volts on each wire.

44. The system of claim 1 wherein the first MICS card is powered via the twisted cable pair, and the line voltage does not exceed ±160 Volts in total or ±80 Volts per wire in accordance with the US safety standards.

45. The system of claim 1 wherein the first MICS card is powered via the twisted cable pair in accordance with the international safety standards, which vary and can go as low as ±50 Volts on each wire.

* * * * *